(12) United States Patent
Omae et al.

(10) Patent No.: US 11,233,237 B2
(45) Date of Patent: Jan. 25, 2022

(54) POSITIVE ELECTRODE ACTIVE MATERIAL CONTAINING LITHIUM COMPOSITE OXIDE AND BATTERY INCLUDING THE SAME

(71) Applicant: Panasonic Intellectual Property Management Co., Ltd., Osaka (JP)

(72) Inventors: Takanori Omae, Osaka (JP); Ryuichi Natsui, Osaka (JP); Takayuki Ishikawa, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 272 days.

(21) Appl. No.: 16/687,703

(22) Filed: Nov. 19, 2019

(65) Prior Publication Data

US 2020/0091514 A1 Mar. 19, 2020

Related U.S. Application Data

(63) Continuation of application No. PCT/JP2018/026115, filed on Jul. 11, 2018.

(30) Foreign Application Priority Data

Sep. 27, 2017 (JP) .............................. JP2017-186101

(51) Int. Cl.
*H01M 4/505* (2010.01)
*C01B 11/24* (2006.01)
(Continued)

(52) U.S. Cl.
CPC ............. *H01M 4/505* (2013.01); *C01B 11/24* (2013.01); *H01B 1/08* (2013.01);
(Continued)

(58) Field of Classification Search
CPC .......... H01B 1/00; H01B 1/08; H01M 4/485; H01M 4/505; H01M 4/525; C01P 2002/72; C01P 2002/76
See application file for complete search history.

(56) References Cited

U.S. PATENT DOCUMENTS 5,308,720 A * 5/1994 Kurokawa ............ H01M 4/525
429/223
7,695,869 B2 * 4/2010 Park ....................... C01G 51/42
429/231.3
(Continued)

FOREIGN PATENT DOCUMENTS

EP 1531506 A1 5/2005
EP 2741353 A1 6/2014
(Continued)

OTHER PUBLICATIONS

English language translation of form PCT/ISA/237 mailed Oct. 2018.*
(Continued)

*Primary Examiner* — Mark Kopec
(74) *Attorney, Agent, or Firm* — McDermott Will and Emery LLP

(57) ABSTRACT

A positive electrode active material contains a lithium composite oxide containing fluorine and oxygen. The lithium composite oxide satisfies $1<Zs/Za<8$, where Zs represents a first ratio of a molar quantity of fluorine to a total molar quantity of fluorine and oxygen in XPS of the lithium composite oxide, and Za represents a second ratio of a molar quantity of fluorine to a total molar quantity of fluorine and oxygen in an average composition of the lithium composite oxide. An XRD pattern of the lithium composite oxide includes a first maximum peak within a first range of 18° to 20° at a diffraction angle 2θ and a second maximum peak within a second range of 43° to 46° at the
(Continued)

diffraction angle 2θ. The ratio $I_{(18°-20°)}/I_{(43°-46°)}$ of a first integrated intensity $I_{(18°-20°)}$ of the first maximum peak to a second integrated intensity $I_{(43°-46°)}$ of the second maximum peak satisfies $0.05 \leq I_{(18°-20°)}/I_{(43°-46°)} \leq 0.90$.

15 Claims, 2 Drawing Sheets

(51) Int. Cl.
  *H01M 10/0525* (2010.01)
  *H01B 1/08* (2006.01)
  *H01M 4/02* (2006.01)
(52) U.S. Cl.
  CPC ..... *H01M 10/0525* (2013.01); *C01P 2002/72* (2013.01); *C01P 2002/76* (2013.01); *C01P 2002/85* (2013.01); *C01P 2006/40* (2013.01); *H01M 2004/028* (2013.01)

(56) References Cited

U.S. PATENT DOCUMENTS

| | | | |
|---|---|---|---|
| 2009/0023067 A1* | 1/2009 | Park | C01G 51/42 429/223 |
| 2010/0233542 A1* | 9/2010 | Endo | C01G 53/50 429/223 |
| 2016/0028080 A1 | 1/2016 | Sugiura | |
| 2016/0351901 A1 | 12/2016 | Saito | |
| 2017/0125808 A1* | 5/2017 | Blangero | H01M 4/505 |

FOREIGN PATENT DOCUMENTS

| | | |
|---|---|---|
| EP | 3118916 A1 | 1/2017 |
| JP | 2000-195514 | 7/2000 |
| JP | 2000-203843 | 7/2000 |
| JP | 2005-053764 | 3/2005 |
| JP | 2012-041257 | 3/2012 |
| JP | 2015-040157 | 3/2015 |
| JP | 2016-025010 | 2/2016 |
| JP | 2016-102043 | 6/2016 |
| JP | 2016-110717 | 6/2016 |
| WO | 2008/023622 | 2/2008 |
| WO | 2012/102354 | 8/2012 |
| WO | 2015/115025 | 8/2015 |

OTHER PUBLICATIONS

The Extended European Search Report dated Oct. 14, 2020 for the related European Patent Application No. 18863407.5.
International Search Report of PCT application No. PCT/JP2018/026115 dated Oct. 16, 2018.

* cited by examiner

POSITIVE ELECTRODE ACTIVE MATERIAL CONTAINING LITHIUM COMPOSITE OXIDE AND BATTERY INCLUDING THE SAME

RELATED APPLICATIONS

This application is a Continuation of PCT Application No. PCT/JP2018/026115 filed Jul. 11, 2018, which claims priority to Japanese Patent Application No. 2017-186101 filed Sep. 27, 2017, the entire contents of each of which are incorporated herein by reference.

BACKGROUND

1. Technical Field

The present disclosure relates to a positive electrode active material for batteries and a battery.

2. Description of the Related Art

Japanese Unexamined Patent Application Publication No. 2016-025010 discloses a positive electrode active material for lithium ion secondary batteries. The positive electrode active material contains a fluorine-containing lithium-nickel-manganese composite oxide particle that contains fluorine in a lithium-nickel-manganese composite oxide particle. The fluorine-containing lithium-nickel-manganese composite oxide particle has different fluorine concentrations between a particle central portion and a surface-layer portion that is closer to the surface than the particle central portion. The fluorine atom concentration Fc (at %) in the particle central portion and the fluorine atom concentration Fs (at %) in the surface-layer portion satisfy the relationship Fc<Fs, the fluorine atom concentration being measured by energy-dispersive X-ray spectroscopy (EDX).

International Publication No. 2012/102354 discloses a method for producing a positive electrode active material for lithium ion secondary batteries, the method including bringing a lithium-containing composite oxide containing a Li element and at least one transition metal element selected from the group consisting of Ni, Co, and Mn (the molar quantity of the Li element is more than 1.2 times higher than the total molar quantity of the transition metal elements) into contact with a fluorine gas.

SUMMARY

In one general aspect, the techniques disclosed here feature a positive electrode active material containing a lithium composite oxide containing fluorine and oxygen. The lithium composite oxide satisfies $1 < Zs/Za < 8$, where Zs represents a first ratio of a molar quantity of the fluorine to a total molar quantity of the fluorine and the oxygen in X-ray photoelectron spectroscopy of the lithium composite oxide, and Za represents a second ratio of a molar quantity of the fluorine to a total molar quantity of the fluorine and the oxygen in an average composition of the lithium composite oxide. An X-ray diffraction pattern of the lithium composite oxide includes a first maximum peak within a first range of 18° to 20° at a diffraction angle 2θ and a second maximum peak within a second range of 43° to 46° at the diffraction angle 2θ. A ratio $I_{(18°-20°)}/I_{(43°-46°)}$ of a first integrated intensity $I_{(18°-20°)}$ of the first maximum peak to a second integrated intensity $I_{(43°-46°)}$ of the second maximum peak satisfies $0.05 \leq I_{(18°-20°)}/I_{(43°-46°)} \leq 0.90$.

General or specific embodiments of the present disclosure may be implemented as a positive electrode active material for batteries, a battery, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
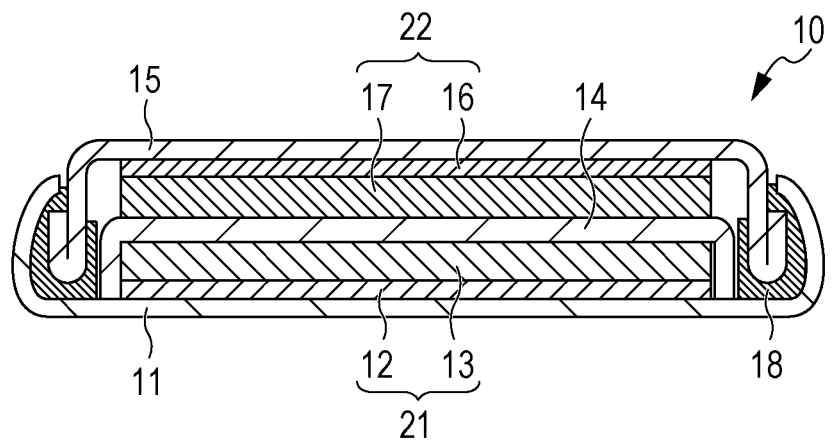
FIG. 1 is a sectional view illustrating a schematic structure of a battery that is an example of a battery according to a second embodiment.

Hereafter, embodiments of the present disclosure will be described.

First Embodiment

A positive electrode active material according to a first embodiment is a positive electrode active material containing a lithium composite oxide. The lithium composite oxide contains F. When Za represents a ratio of the molar quantity of F to the total molar quantity of F and O based on the average composition of the lithium composite oxide and Zs represents a ratio of the molar quantity of F to the total molar quantity of F and O based on the XPS measurement of the lithium composite oxide, $1 < Zs/Za$ is satisfied. The integrated intensity ratio $I_{(18°-20°)}/I_{(43°-46°)}$ of a first maximum peak present at a diffraction angle 2θ of 18° or more and 20° or less to a second maximum peak present at a diffraction angle 2θ of 43° or more and 46° or less in an XRD pattern satisfies $0.05 \leq I_{(18°-20°)}/I_{(43°-46°)} \leq 0.90$.

In the present disclosure, the term "average composition" of the lithium composite oxide refers to a composition obtained by performing elemental analysis on the lithium composite oxide without considering the difference in composition of each phase. The average composition typically refers to a composition obtained by performing elemental analysis in a region equal to or larger than the size of primary particles of the lithium composite oxide.

In the present disclosure, the term "first maximum peak" refers to a peak having the maximum peak intensity among one or more peaks that appear at a diffraction angle 2θ of 18° or more and 20° or less in an XRD pattern. Similarly, the term "second maximum peak" refers to a peak having the maximum peak intensity among one or more peaks that appear at a diffraction angle 2θ of 43° or more and 46° or less in an XRD pattern.

This configuration can provide batteries having good cycle characteristics.

Herein, the term "batteries having good cycle characteristics" refers to batteries having a high capacity retention even after a charge-discharge cycle is repeatedly performed a plurality of times. In other words, the batteries having good cycle characteristics are batteries whose capacity does not considerably decrease even after a charge-discharge cycle is repeatedly performed a plurality of times.

In the case where, for example, a lithium ion battery is produced using the positive electrode active material according to the first embodiment, the lithium ion battery has an oxidation-reduction potential (based on Li/Li$^+$) of about 3.5 V. The lithium ion battery has a capacity of about 250 mAh/g or more. In the lithium ion battery, the capacity retention after 20 cycles of a charge-discharge test is about 75% or more.

The lithium composite oxide according to the first embodiment contains F. For example, the molar quantity of F contained in the lithium composite oxide is smaller than the molar quantity of O contained in the lithium composite oxide.

In this configuration, the crystal structure is probably stabilized by partly replacing oxygen with F that is electrochemically inactive. The cation-anion interaction is also increased by partly replacing oxygen with F that has a high electronegativity, thereby improving the discharge capacity and/or operating voltage of the battery. Furthermore, by dissolving F that has a high electronegativity, electrons are localized compared with the case where F is not contained. This can suppress the elimination of oxygen during charge and thus the crystal structure is stabilized. Therefore, a larger amount of Li can be probably intercalated and deintercalated. By combining these effects, the high-voltage durability is improved and batteries having high capacity and good cycle characteristics can be provided.

The lithium composite oxide according to the first embodiment satisfies 1<Zs/Za, where Za represents a ratio of the molar quantity of F to the total molar quantity of F and O based on the average composition of the lithium composite oxide and Zs represents a ratio of the molar quantity of F to the total molar quantity of F and O based on the XPS measurement of the lithium composite oxide.

In this configuration, the fluorine content in a surface-layer portion of the lithium composite oxide is higher than the fluorine content in a central portion. That is, the lithium composite oxide has a F concentration gradient from the central portion to the surface-layer portion in each particle thereof. By controlling the gradient within the above range, an excessive redox reaction of oxygen in the surface-layer portion can be suppressed. This can provide batteries having good cycle characteristics.

If Zs/Za is 1 or less in the lithium composite oxide according to the first embodiment, it is probable that the capacity is excessively increased by an oxidation-reduction reaction of oxygen in the surface-layer portion, and thus the crystal structure is destabilized during deintercalation of Li. This results in insufficient cycle characteristics.

The lithium composite oxide according to the first embodiment may further satisfy Zs/Za<8.

In this configuration, it is probable that an excessive decrease in the fluorine content in the central portion is suppressed and thus the crystal structure is stabilized. This results in sufficient cycle characteristics.

The lithium composite oxide according to the first embodiment may also satisfy 1.4≤Zs/Za≤7.8.

This configuration can provide batteries having better cycle characteristics.

The lithium composite oxide according to the first embodiment may also satisfy 2.8≤Zs/Za≤7.8.

This configuration can provide batteries having better cycle characteristics.

The "average composition" of the lithium composite oxide can be determined by, for example, ICP emission spectrometry, an inert gas fusion-infrared absorption method, ion chromatography, or a combination thereof.

The "XPS measurement" of the lithium composite oxide is, for example, an XPS (X-ray photoelectron spectroscopy) measurement performed on a surface-layer portion of at least one particle of the lithium composite oxide. That is, the "XPS measurement" of the lithium composite oxide is performed to determine a composition, for example, in a region having a depth of several nanometers from the surface of at least one particle of the lithium composite oxide.

Herein, for example, the lithium composite oxide in International Publication No. 2012/102354 does not contain F in the central portion of the particles thereof, which poses a problem in terms of the stability of the crystal structure during charge and discharge.

On the other hand, the lithium composite oxide according to the first embodiment has a F concentration gradient from the central portion to the surface-layer portion of the particles thereof and thus the F concentration in the central portion is lower than that in the surface-layer portion. However, the lithium composite oxide according to the first embodiment contains F even in the central portion of the particles thereof. Therefore, the lithium composite oxide according to the first embodiment can be used to provide batteries having good cycle characteristics.

Furthermore, for example, if particles of a positive electrode active material are constituted by a central portion formed of a particular F-containing lithium composite oxide and a surface-layer portion formed of, for example, a F-containing lithium composite oxide containing "cation elements such as transition metals" other than those contained in the particular F-containing lithium composite oxide or a metal fluoride, a problem such as cracking may arise because of the different expansion coefficient between the central portion and the surface-layer portion during charge and discharge.

On the other hand, the lithium composite oxide according to the first embodiment contains common "cation elements such as transition metals" in the central portion and surface-layer portion of the particles thereof. Therefore, the lithium composite oxide according to the first embodiment can be used to provide batteries having good cycle characteristics.

In the lithium composite oxide according to the first embodiment, the integrated intensity ratio $I_{(18°\text{-}20°)}/I_{(43°\text{-}46°)}$ of a maximum peak present at a diffraction angle 2θ of 18° or more and 20° or less to a maximum peak present at a diffraction angle 2θ of 43° or more and 46° or less in an XRD pattern satisfies $0.05 \leq I_{(18°\text{-}20°)}/I_{(43°\text{-}46°)} \leq 0.90$.

This configuration can provide batteries having high capacity and good cycle characteristics.

The integrated intensity of each diffraction peak can be calculated using, for example, software included with an XRD instrument (e.g., PDXL included with a powder X-ray diffractometer manufactured by Rigaku Corporation). In this case, the integrated intensity of each diffraction peak can be determined by, for example, calculating an area within ±3° of an angle of each diffraction peak.

Herein, the ratio $I_{(18°\text{-}20°)}/I_{(43°\text{-}46°)}$ is a parameter that indicates the regularity of an arrangement of lithium and "cation elements such as transition metals" in the crystal structure of the lithium composite oxide according to the first embodiment. When the regularity decreases, the ratio $I_{(18°\text{-}20°)}/I_{(43°\text{-}46°)}$ decreases. When the regularity increases, the ratio $I_{(18°\text{-}20°)}/I_{(43°\text{-}46°)}$ increases.

If the lithium composite oxide according to the first embodiment has a ratio $I_{(18°\text{-}20°)}/I_{(43°\text{-}46°)}$ of less than 0.05, the regularity excessively decreases, which results in insufficient capacity or insufficient cycle characteristics.

If the lithium composite oxide according to the first embodiment has a ratio $I_{(18°-20°)}/I_{(43°-46°)}$ of more than 0.90, the regularity excessively increases, which results in insufficient capacity or insufficient cycle characteristics.

The lithium composite oxide according to the first embodiment satisfies $0.05 \leq I_{(18°-20°)}/I_{(43°-46°)} \leq 0.90$ and therefore has a crystal structure having a partly regularized arrangement of lithium and "cation elements such as transition metals". This crystal structure shows better characteristics than a simple rock-salt structure or a layered structure in the related art. That is, a large amount of Li can be intercalated and deintercalated while high Li diffusibility and high stability of the crystal structure are maintained. This can provide batteries having high capacity and good cycle characteristics.

The lithium composite oxide according to the first embodiment satisfies $1 < Zs/Za$ and $0.05 \leq I_{(18°-20°)}/I_{(43°-46°)} \leq 0.90$. Thus, an excessive redox reaction of oxygen in the surface-layer portion can be suppressed while high stability of the crystal structure is maintained. Specifically, the following mechanism is assumed.

When $0.05 \leq I_{(18°-20°)}/I_{(43°-46°)} \leq 0.90$ is satisfied, the crystal structure of the lithium composite oxide is supported by a plurality of pillars each having a transition metal-anion octahedral shape. Thus, the crystal structure can be stably maintained even if lithium is deintercalated through an electrode reaction. Since these pillars form a three-dimensional network, some of the pillars are exposed at the surface-layer portion of the lithium composite oxide. The surface-layer portion of the lithium composite oxide is in direct contact with an electrolytic solution and therefore the structure readily deteriorates through a redox reaction. This deterioration may spread from the surface-layer portion to the inside of the lithium composite oxide. In contrast, the lithium composite oxide according to the first embodiment satisfies $1 < Zs/Za$ and thus is designed such that fluorine is present in the surface-layer portion in a high concentration. This fluorine is probably present in a large amount particularly in pillars exposed at the surface-layer portion and suppresses a redox reaction that causes the deterioration. This improves the structural stability of the surface-layer portion. Consequently, the structural stability of the whole lithium composite oxide can be improved.

Accordingly, the lithium composite oxide according to the first embodiment can be used to provide batteries having good cycle characteristics.

Next, the space groups of a crystal structure that can be included in the lithium composite oxide according to the first embodiment will be described using examples.

The lithium composite oxide according to the first embodiment may include a phase having a crystal structure that belongs to a space group C2/m, R-3m, or Fd-3m.

This configuration can provide batteries having higher capacity and better cycle characteristics.

The lithium composite oxide according to the first embodiment may include a phase having a crystal structure that belongs to a space group C2/m.

This configuration can provide batteries having higher capacity and better cycle characteristics.

The lithium composite oxide according to the first embodiment may include a phase having a crystal structure that belongs to a space group C2/m, R-3m, or Fd-3m and may further include a phase having a crystal structure that belongs to a space group Fm-3m.

This configuration can provide batteries having higher capacity and better cycle characteristics.

In a general CuKα XRD pattern, in the case of the crystal structure that belongs to a space group C2/m, a maximum peak present at a diffraction angle 2θ of 18° or more and 20° or less corresponds to a (001) plane, and a maximum peak present at a diffraction angle 2θ of 43° or more and 46° or less corresponds to a (131) plane.

In a general CuKα XRD pattern, in the case of the crystal structure that belongs to a space group R-3m, a maximum peak present at a diffraction angle 2θ of 18° or more and 20° or less corresponds to a (003) plane, and a maximum peak present at a diffraction angle 2θ of 43° or more and 46° or less corresponds to a (104) plane.

In a general CuKα XRD pattern, in the case of the crystal structure that belongs to a space group Fd-3m, a maximum peak present at a diffraction angle 2θ of 18° or more and 20° or less corresponds to a (111) plane, and a maximum peak present at a diffraction angle 2θ of 43° or more and 46° or less corresponds to a (400) plane.

In a general CuKα XRD pattern, in the case of the crystal structure that belongs to a space group Fm-3m, any peak is not present at a diffraction angle 2θ of 18° or more and 20° or less, and a maximum peak present at a diffraction angle 2θ of 43° or more and 46° or less corresponds to a (200) plane.

Next, the above-described examples for the space groups of a crystal structure that can be included in the lithium composite oxide according to the first embodiment are classified into cases 1 to 4, and each of the cases will be described in detail.

Case 1: Case of Including Crystal Structure that Belongs to Space Group C2/m

The lithium composite oxide according to the first embodiment may include a phase that has a crystal structure which belongs to a space group C2/m and that satisfies $0.05 \leq I_{(18°-20°)}/I_{(43°-46°)} \leq 0.90$.

This configuration can provide batteries having higher capacity and better cycle characteristics.

In the case 1, the ratio $I_{(18°-20°)}/I_{(43°-46°)}$ is a parameter that is an index of "cation mixing" in a lithium composite oxide having a crystal structure that belongs to a space group C2/m. The term "cation mixing" in the present disclosure refers to a state in which a lithium atom and a "cation atom such as a transition metal" are replaced with each other in a crystal structure of the lithium composite oxide. As the degree of "cation mixing" decreases, the ratio $I_{(18°-20°)}/I_{(43°-46°)}$ increases. As the degree of "cation mixing" increases, the ratio $I_{(18°-20°)}/I_{(43°-46°)}$ decreases.

In the lithium composite oxide according to the first embodiment, in the case 1, the Li occupancy in "all of 2b sites and 4g sites" that correspond to a so-called "transition metal layer" is probably, for example, 25 mol % or more and less than 50 mol %. That is, the lithium atom and the "cation atom such as a transition metal" are considered to be sufficiently subjected to "cation mixing". Thus, in addition to high Li diffusibility in a "Li layer", the Li diffusibility in the "transition metal layer" is also improved. Furthermore, the Li diffusibility between the "Li layer" and the "transition metal layer" is improved. Therefore, the case 1 can provide batteries having a higher capacity than those provided by known ordered (i.e., the degree of "cation mixing" is low) lithium composite oxides.

In the case 1, if the lithium composite oxide according to the first embodiment has a ratio $I_{(18°-20°)}/I_{(43°-46°)}$ of less than 0.05, the Li occupancy in the "transition metal layer" excessively increases, which thermodynamically destabilizes the crystal structure. Thus, the crystal structure is broken with the deintercalation of Li during charge, resulting in insufficient capacity.

In the case 1, if the lithium composite oxide according to the first embodiment has a ratio $I_{(18°-20°)}/I_{(43°-46°)}$ of more than 0.90, the "cation mixing" is reduced and the Li occupancy in the "transition metal layer" decreases, which decreases the number of three-dimensional Li diffusion paths. Thus, the Li diffusibility deteriorates, resulting in insufficient capacity.

In the case 1, even when a large amount of Li is deintercalated in the lithium composite oxide according to the first embodiment, transition metal-anion octahedrons serving as pillars form a three-dimensional network and thus the crystal structure can be stably maintained. This can provide batteries having higher capacity and better cycle characteristics.

It is believed that when a large amount of Li is deintercalated, the crystal structure that belongs to a space group C2/m readily maintains its layered structure and is not easily broken compared with, for example, the crystal structure that belongs to a space group R-3m.

For example, Japanese Unexamined Patent Application Publication No. 2016-26981 given as a related-art example discloses a positive electrode active material containing a lithium composite oxide which has a crystal structure that belongs to a space group R-3m and in which a lithium atom and a "cation atom such as a transition metal" are not sufficiently subjected to "cation mixing". In the related art, it has been believed that "cation mixing" should be reduced in a lithium composite oxide as disclosed in Japanese Unexamined Patent Application Publication No. 2016-26981.

On the other hand, in the case 1, the lithium composite oxide according to the first embodiment can be used to provide batteries having a high capacity that is beyond expectation in the related art.

In the case 1, the lithium composite oxide according to the first embodiment may satisfy $0.11 \leq I_{(18°-20°)}/I_{(43°-46°)} \leq 0.85$.

This configuration can provide batteries having higher capacity and better cycle characteristics.

In the case 1, the lithium composite oxide according to the first embodiment may satisfy $0.44 \leq I_{(18°-20°)}/I_{(43°-46°)} \leq 0.85$.

This configuration can provide batteries having higher capacity and better cycle characteristics.

Case 2: Case of Including Crystal Structure that Belongs to Space Group R-3m

The lithium composite oxide according to the first embodiment may include a phase that has a crystal structure which belongs to a space group R-3m and that satisfies $0.05 \leq I_{(18°-20°)}/I_{(43°-46°)} \leq 0.90$.

This configuration can provide batteries having higher capacity and better cycle characteristics.

In the case 2, the ratio $I_{(18°-20°)}/I_{(43°-46°)}$ is a parameter that is an index of "cation mixing" in a lithium composite oxide having a crystal structure that belongs to a space group R-3m.

In the case 2, the lithium atom and the "cation atom such as a transition metal" are considered to be sufficiently subjected to "cation mixing" in the lithium composite oxide according to the first embodiment. Thus, in addition to high Li diffusibility in a "Li layer", the Li diffusibility in the "transition metal layer" is also improved. Furthermore, the Li diffusibility between the "Li layer" and the "transition metal layer" is improved. Therefore, the case 2 can provide batteries having a higher capacity than those provided by known ordered (i.e., the degree of "cation mixing" is low) lithium composite oxides.

In the case 2, if the lithium composite oxide according to the first embodiment has a ratio $I_{(18°-20°)}/I_{(43°-46°)}$ of less than 0.05, the Li occupancy in the "transition metal layer" excessively increases, which thermodynamically destabilizes the crystal structure. Thus, the crystal structure is broken with the deintercalation of Li during charge, resulting in insufficient capacity.

In the case 2, if the lithium composite oxide according to the first embodiment has a ratio $I_{(18°-20°)}/I_{(43°-46°)}$ of more than 0.90, the "cation mixing" is reduced and the Li occupancy in the "transition metal layer" decreases, which decreases the number of three-dimensional Li diffusion paths. Thus, the Li diffusibility deteriorates, resulting in insufficient capacity.

In the case 2, even when a large amount of Li is deintercalated in the lithium composite oxide according to the first embodiment, transition metal-anion octahedrons serving as pillars form a three-dimensional network and thus the crystal structure can be stably maintained. This can provide batteries having higher capacity and better cycle characteristics.

For example, Japanese Unexamined Patent Application Publication No. 2016-26981 given as a related-art example discloses a positive electrode active material containing a lithium composite oxide which has a crystal structure that belongs to a space group R-3m and in which a lithium atom and a "cation atom such as a transition metal" are not sufficiently subjected to "cation mixing". In the related art, it has been believed that "cation mixing" should be reduced in a lithium composite oxide as disclosed in Japanese Unexamined Patent Application Publication No. 2016-26981.

On the other hand, in the case 2, the lithium composite oxide according to the first embodiment can be used to provide batteries having a high capacity that is beyond expectation in the related art.

In the case 2, the lithium composite oxide according to the first embodiment may satisfy $0.62 \leq I_{(18°-20°)}/I_{(43°-46°)} \leq 0.90$.

This configuration can provide batteries having higher capacity and better cycle characteristics.

In the case 2, the lithium composite oxide according to the first embodiment may satisfy $0.67 \leq I_{(18°-20°)}/I_{(43°-46°)} \leq 0.85$.

This configuration can provide batteries having higher capacity and better cycle characteristics.

Case 3: Case of Including Crystal Structure that Belongs to Space Group Fd-3m

The lithium composite oxide according to the first embodiment may include a phase that has a crystal structure which belongs to a space group Fd-3m and that satisfies $0.05 \leq I_{(18°-20°)}/I_{(43°-46°)} \leq 0.90$.

This configuration can provide batteries having higher capacity and better cycle characteristics.

In the case 3, the ratio $I_{(18°-20°)}/I_{(43°-46°)}$ is a parameter that is an index of "cation mixing" in a lithium composite oxide having a crystal structure that belongs to a space group Fd-3m.

In the lithium composite oxide according to the first embodiment, in the case 3, a lithium atom and a "cation atom such as a transition metal" are probably sufficiently subjected to "cation mixing" in "8a sites, 16d sites, and 16c sites" corresponding to "cation sites" (i.e., a "Li layer" and a "transition metal layer"). The Li occupancy in each of the above sites may be any occupancy as long as $0.05 \leq I_{(18°-20°)}/I_{(43°-46°)} \leq 0.90$ is satisfied. Thus, in addition to high Li diffusibility in a "Li layer", the Li diffusibility in the "transition metal layer" is also improved. Furthermore, the Li diffusibility between the "Li layer" and the "transition metal layer" is improved. Therefore, the case 3 can provide batteries having a higher capacity than those provided by known ordered (i.e., the degree of "cation mixing" is low) lithium composite oxides.

In the case 3, if the lithium composite oxide according to the first embodiment has a ratio $I_{(18°-20°)}/I_{(43°-46°)}$ of less than 0.05, the Li occupancy in the "transition metal layer" excessively increases, which thermodynamically destabilizes the crystal structure. Thus, the crystal structure is broken with the deintercalation of Li during charge, resulting in insufficient capacity.

In the case 3, if the lithium composite oxide according to the first embodiment has a ratio $I_{(18°-20°)}/I_{(43°-46°)}$ of more than 0.90, the "cation mixing" is reduced and the Li occupancy in the "transition metal layer" decreases, which decreases the number of three-dimensional Li diffusion paths. Thus, the Li diffusibility deteriorates, resulting in insufficient capacity.

In the case 3, even when a large amount of Li is deintercalated in the lithium composite oxide according to the first embodiment, transition metal-anion octahedrons serving as pillars form a three-dimensional network and thus the crystal structure can be stably maintained. This can provide batteries having higher capacity and better cycle characteristics.

It is believed that when a large amount of Li is deintercalated, the crystal structure that belongs to a space group Fd-3m readily maintains its layered structure and is not easily broken compared with, for example, the crystal structure that belongs to a space group R-3m.

For example, Japanese Unexamined Patent Application Publication No. 2008-156163 given as a related-art example discloses a positive electrode active material containing a lithium composite oxide which has a crystal structure that belongs to a space group Fd-3m and in which a lithium atom and a "cation atom such as a transition metal" are not sufficiently subjected to cation mixing. The lithium composite oxide disclosed in Japanese Unexamined Patent Application Publication No. 2008-156163 substantially satisfies $2 \leq I_{(18°-20°)}/I_{(43°-46°)} \leq 3$. It is described that this considerably reduces the disturbance of the crystal structure and therefore good battery characteristics are achieved. In the related art, it has been believed that "cation mixing" should be reduced in a lithium composite oxide as disclosed in Japanese Unexamined Patent Application Publication No. 2008-156163.

On the other hand, in the case 3, the lithium composite oxide according to the first embodiment can be used to provide batteries having a high capacity that is beyond expectation in the related art.

In the case 3, the lithium composite oxide according to the first embodiment may satisfy $0.05 \leq I_{(18°-20°)}/I_{(43°-46°)} \leq 0.70$.

This configuration can provide batteries having higher capacity and better cycle characteristics.

In the case 3, the lithium composite oxide according to the first embodiment may satisfy $0.05 \leq I_{(18°-20°)}/I_{(43°-46°)} \leq 0.30$.

This configuration can provide batteries having higher capacity and better cycle characteristics.

Case 4: Case Further Including Phase Having Crystal Structure that Belongs to Space Group Fm-3m The lithium composite oxide according to the first embodiment may include a phase having a crystal structure that belongs to a space group C2/m, R-3m, or Fd-3m and also a phase having a crystal structure that belongs to a space group Fm-3m and may satisfy $0.05 \leq I_{(18°-20°)}/I_{(43°-46°)} \leq 0.90$.

This configuration can provide batteries having higher capacity and better cycle characteristics.

In other words, the lithium composite oxide according to the first embodiment may include a first phase having a crystal structure that belongs to a space group Fm-3m and a second phase having a crystal structure that belongs to a space group C2/m, R-3m, or Fd-3m and may satisfy $0.05 \leq I_{(18°-20°)}/I_{(43°-46°)} \leq 0.90$.

The crystal structure that belongs to a space group Fm-3m is a distorted rock-salt structure in which a lithium atom and a "cation atom such as a transition metal" are randomly arranged. Therefore, the crystal structure that belongs to a space group Fm-3m can occlude a larger amount of Li therein than $LiCoO_2$, which is a typical known material. However, the crystal structure that belongs to a space group Fm-3m has low Li diffusibility because Li diffuses only through adjacent Li or vacancies.

On the other hand, the crystal structure that belongs to a space group C2/m, R-3m, or Fd-3m has high Li diffusibility because two-dimensional Li diffusion paths are present. The crystal structure that belongs to a space group C2/m, R-3m, or Fd-3m is a stable crystal structure because of its robust network of transition metal-anion octahedrons.

In the case 4, the ratio $I_{(18°-20°)}/I_{(43°-46°)}$ is a parameter that is an index of "cation mixing" in the second phase and that is an index of the existence ratio of the first phase and the second phase. As the existence ratio of the first phase increases, the ratio $I_{(18°-20°)}/I_{(43°-46°)}$ decreases. As the existence ratio of the second phase increases, the ratio $I_{(18°-20°)}/I_{(43°-46°)}$ increases.

In the lithium composite oxide according to the first embodiment, in the case 4, the first phase and the second phase are mixed with each other in a good balance. Therefore, it is probable that in the case 4 of the lithium composite oxide according to the first embodiment, a large amount of Li can be intercalated and deintercalated and the Li diffusibility and the stability of the crystal structure are high. Thus, the case 4 can provide batteries having higher capacity and better cycle characteristics than those provided by known lithium composite oxides.

In the case 4, if the lithium composite oxide according to the first embodiment has a ratio $I_{(18°-20°)}/I_{(43°-46°)}$ of less than 0.05, the existence ratio of the second phase decreases, which probably deteriorates the Li diffusibility and the stability of the crystal structure. This results in insufficient capacity or insufficient cycle characteristics.

In the case 4, if the lithium composite oxide according to the first embodiment has a ratio $I_{(18°-20°)}/I_{(43°-46°)}$ of more than 0.90, the existence ratio of the first phase decreases, which probably decreases the amount of Li intercalated and deintercalated during charge and discharge. This results in insufficient capacity or insufficient cycle characteristics.

For example, Japanese Unexamined Patent Application Publication No. 2008-156163 given as a related-art example discloses a positive electrode active material containing a lithium composite oxide that has a crystal structure which belongs to a space group Fd-3m and that substantially satisfies $2 \leq I_{(18°-20°)}/I_{(43°-46°)} \leq 3$. It is described that this considerably reduces the disturbance of the crystal structure and therefore good battery characteristics are achieved.

On the other hand, in the case 4, the lithium composite oxide according to the first embodiment can be used to provide batteries having a high capacity that is beyond expectation in the related art.

In the case 4, the second phase may have a crystal structure that belongs to a space group Fd-3m.

This configuration can provide batteries having higher capacity and better cycle characteristics. In the crystal structure that belongs to a space group Fd-3m (i.e., spinel structure), transition metal-anion octahedrons serving as pillars form a three-dimensional network. On the other hand, in the crystal structure that belongs to a space group R-3m or C2/m (layered structure), transition metal-anion octahedrons serving as pillars normally form a two-dimensional network. Therefore, when the second phase has a crystal structure that belongs to a space group Fd-3m, the structure is not easily destabilized during charge and discharge and the discharge capacity is further increased.

In the case 4, the lithium composite oxide according to the first embodiment may satisfy $0.10 \leq I_{(18°-20°)}/I_{(43°-46°)} \leq 0.70$.

This configuration can provide batteries having higher capacity and better cycle characteristics.

In the case 4, typically, a plurality of regions formed of the first phase and a plurality of regions formed of the second phase are three-dimensionally arranged in a random manner.

In this case, the lithium composite oxide is a multiphase mixture. For example, a layer structure including a bulk layer and a coating layer that coats the bulk layer does not correspond to the multiphase mixture in the present disclosure. The multiphase mixture refers to a substance including a plurality of phases, and is not limited to the case where a plurality of materials corresponding to such phases are mixed with each other during production.

The lithium composite oxide can be identified to be a multiphase mixture by X-ray diffraction measurement and electron diffraction measurement as described later. Specifically, when a spectrum obtained by measuring a certain lithium composite oxide includes peaks that indicate characteristics of a plurality of phases, the lithium composite oxide is judged to be a multiphase mixture.

This configuration increases the number of three-dimensional Li diffusion paths, which allows a larger amount of Li to be intercalated and deintercalated. Thus, batteries having higher capacity and better cycle characteristics can be provided.

In the case 4, the first phase and the second phase may have a domain structure in which a certain atom is shared within the same particle.

This configuration increases the number of three-dimensional Li diffusion paths, which allows a larger amount of Li to be intercalated and deintercalated. Thus, batteries having higher capacity and better cycle characteristics can be provided.

In the case 4, the "average composition" of the lithium composite oxide according to the first embodiment refers to a chemical composition obtained by averaging the mixing state of the first phase and the second phase. The first phase and the second phase may have the same chemical composition, but do not necessarily have completely the same chemical composition.

For example, in the case 4 of the lithium composite oxide according to the first embodiment, the complete identification of the space group and Miller index to which each of the maximum peak present at a diffraction angle 2θ of 18° or more and 20° or less and the maximum peak present at a diffraction angle 2θ of 43° or more and 46° or less corresponds is not always easily performed.

In this case, electron diffraction measurement that uses a transmission electron microscope (TEM) can be performed in addition to the above-described X-ray diffraction measurement. By observing an electron diffraction pattern by a publicly known method, the space group to which the crystal structure in the lithium composite oxide according to the first embodiment belongs can be identified. This confirms that, for example, in the case 4, the lithium composite oxide according to the first embodiment includes a first phase having a crystal structure that belongs to a space group Fm-3m and a second phase having a crystal structure that belongs to a space group C2/m, R-3m, or Fd-3m.

The space groups of a crystal structure that can be included in the lithium composite oxide according to the first embodiment have been described using the cases 1 to 4 as examples.

Next, elements that can be contained in the lithium composite oxide according to the first embodiment will be specifically described using examples.

The lithium composite oxide according to the first embodiment may contain, for example, one or more elements selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al as the "cation elements such as transition metals" other than lithium.

This configuration can provide batteries having higher capacity and better cycle characteristics.

The lithium composite oxide according to the first embodiment may contain, for example, at least one element selected from the group consisting of Mn, Co, Ni, Fe, Cu, V, Ti, Cr, and Zn, that is, at least one 3d transition metal element as the above-described "cation elements such as transition metals".

This configuration can provide batteries having higher capacity and better cycle characteristics.

The lithium composite oxide according to the first embodiment may contain, for example, one or more elements selected from the group consisting of Mn, Co, Ni, and Al as the above-described "cation elements such as transition metals".

This configuration can provide batteries having higher capacity and better cycle characteristics.

The lithium composite oxide according to the first embodiment may contain Mn.

In this configuration, when Mn having orbitals easily hybridized with those of oxygen is contained, the elimination of oxygen during charge is suppressed, which stabilizes the crystal structure. This probably allows a larger amount of Li to be intercalated and deintercalated. Thus, batteries having higher capacity and better cycle characteristics can be provided.

Next, an example of the chemical composition of the lithium composite oxide according to the first embodiment will be described.

The average composition of the lithium composite oxide according to the first embodiment may be represented by composition formula (1) below.

$$Li_xMe_yO_\alpha F_\beta \qquad \text{formula (1)}$$

where Me may represent one or more elements selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al.

Furthermore, the following conditions may be satisfied in the composition formula (1):

$1.05 \leq x \leq 1.4$, $0.6 \leq y \leq 0.95$, $1.2 \leq \alpha < 2$, and $0 < \beta \leq 0.8$.

This configuration can provide batteries having higher capacity and better cycle characteristics.

In this case, the ratio "Za" of the molar quantity of F to the total molar quantity of F and O based on the average composition of the lithium composite oxide according to the first embodiment can be represented by "$\beta/(\alpha+\beta)$".

In the first embodiment, when Me is constituted by two or more elements (e.g., Me' and Me") and the composition ratio is "Me'$_{y1}$Me"$_{y2}$", "y=y1+y2" is given. For example, when Me is constituted by two elements (Mn and Co) and the composition ratio is "Mn$_{0.6}$Co$_{0.2}$", "y=0.6+0.2=0.8" is given.

When x is 1.05 or more in the composition formula (1), the amount of Li that can be used is increased. This increases the capacity.

When x is 1.4 or less in the composition formula (1), the oxidation-reduction reaction of Me can be more utilized. As a result, the oxidation-reduction reaction of oxygen is less utilized. Thus, the crystal structure is stabilized. This increases the capacity.

When y is 0.6 or more in the composition formula (1), the oxidation-reduction reaction of Me can be more utilized. As a result, the oxidation-reduction reaction of oxygen is less utilized. Thus, the crystal structure is stabilized. This increases the capacity.

When y is 0.95 or less in the composition formula (1), the amount of Li that can be used is increased. This increases the capacity.

When $\alpha$ is 1.2 or more in the composition formula (1), the amount of charge compensation due to the oxidation-reduction reaction of oxygen can be prevented from decreasing. This increases the capacity.

When $\alpha$ is less than 2 in the composition formula (1), an excess increase in the capacity due to the oxidation-reduction reaction of oxygen can be prevented, which stabilizes a structure when Li is deintercalated. This increases the capacity.

When $\beta$ is more than 0 in the composition formula (1), the influence of F that is electrochemically inactive stabilizes a structure when Li is deintercalated. This increases the capacity.

When $\beta$ is 0.8 or less in the composition formula (1), the influence of F that is electrochemically inactive can be prevented from increasing, which improves the electron conductivity. This increases the capacity.

In the composition formula (1), Me may include at least one element selected from the group consisting of Mn, Co, Ni, Fe, Cu, V, Ti, Cr, and Zn, that is, may include at least one 3d transition metal element.

This configuration can provide batteries having higher capacity and better cycle characteristics.

In the composition formula (1), Me may include one or more elements selected from the group consisting of Mn, Co, Ni, and Al.

This configuration can provide batteries having higher capacity and better cycle characteristics.

In the composition formula (1), Me may include Mn.

That is, Me may represent, for example, Mn.

Alternatively, Me may include, for example, Mn and one or more elements selected from the group consisting of Co, Ni, Fe, Cu, V, Nb, Mo, Ti, Cr, Zr, Zn, Na, K, Ca, Mg, Pt, Au, Ag, Ru, W, B, Si, P, and Al.

This configuration can provide batteries having higher capacity and better cycle characteristics.

In the composition formula (1), the Mn content in Me may be 50 mol % or more. That is, the molar ratio (Mn/Me ratio) of Mn to Me including Mn may be 0.5 to 1.0.

In this configuration, when Me sufficiently includes Mn having orbitals easily hybridized with those of oxygen, the elimination of oxygen during charge is further suppressed. This can provide batteries having higher capacity and better cycle characteristics.

In the composition formula (1), Me may include 20 mol % or less of one or more elements selected from the group consisting of B, Si, P, and Al.

In this configuration, the structure is stabilized by adding an element that readily forms covalent bonds, which improves the cycle characteristics. This can provide batteries having a longer life.

In the composition formula (1), the following conditions may be satisfied:

$1.15 \leq x \leq 1.25$, and $0.75 \leq y \leq 0.85$.

This configuration can provide batteries having higher capacity.

In the composition formula (1), the following conditions may be satisfied:

$1.33 \leq \alpha \leq 1.9$, and $0.1 \leq \beta \leq 0.67$.

In this configuration, a sufficient and appropriate amount of F is contained. This can provide batteries having higher capacity and better cycle characteristics.

In the composition formula (1), the ratio of "Li" and "Me" is represented by x/y.

In the composition formula (1), $1.3 \leq x/y \leq 1.9$ may be satisfied.

This configuration can provide batteries having higher capacity.

When x/y is more than 1, the proportion of the number of Li atoms at sites at which Li atoms are located is large compared with known positive electrode active materials represented by, for example, composition formula LiMnO$_2$. This allows a larger amount of Li to be intercalated and deintercalated.

When x/y is 1.3 or more, a large amount of Li can be used and thus the diffusion paths of Li are appropriately formed. This can provide batteries having higher capacity.

When x/y is 1.9 or less, the oxidation-reduction reaction of Me can be more utilized. As a result, the oxidation-reduction reaction of oxygen is less utilized. Furthermore, the crystal structure can be prevented from being destabilized when Li is deintercalated during charge, and thus the efficiency of intercalating Li during discharge can be prevented from decreasing. This can provide batteries having higher capacity.

In the composition formula (1), $1.38 \leq x/y \leq 1.67$ may be satisfied.

This configuration can provide batteries having higher capacity.

In the composition formula (1), $1.38 \leq x/y \leq 1.5$ may be satisfied.

This configuration can provide batteries having higher capacity.

In the composition formula (1), the ratio of "O" and "F" is represented by $\alpha/\beta$.

In the composition formula (1), $2 \leq \alpha/\beta \leq 19$ may be satisfied.

This configuration can provide batteries having higher capacity.

When $\alpha/\beta$ is 2 or more, the amount of charge compensation due to the oxidation-reduction reaction of oxygen can be prevented from decreasing. Furthermore, the influence of F that is electrochemically inactive can be reduced and thus the electron conductivity is improved. This can provide batteries having higher capacity.

When $\alpha/\beta$ is 19 or less, an excess increase in the capacity due to the oxidation-reduction reaction of oxygen can be prevented, which stabilizes a structure when Li is deintercalated. Furthermore, the influence of F that is electrochemically inactive stabilizes a structure when Li is deintercalated. This can provide batteries having higher capacity.

In the composition formula (1), $2 \leq \alpha/\beta \leq 5$ may be satisfied.

This configuration can provide batteries having higher capacity.

In the composition formula (1), the ratio of "Li+Me" and "O+F" (i.e., the ratio of "cation" and "anion") is represented by $(x+y)/(\alpha+\beta)$.

In the composition formula (1), $0.75 \leq (x+y)/(\alpha+\beta) \leq 1.2$ may be satisfied.

This configuration can provide batteries having higher capacity.

When $(x+y)/(\alpha+\beta)$ is 0.75 or more, the generation of a large amount of impurities due to phase separation during synthesis can be prevented. This can provide batteries having higher capacity.

When $(x+y)/(\alpha+\beta)$ is 1.2 or less, a structure with a small amount of anion deficiency is formed, and thus the crystal structure is stabilized when Li is deintercalated during charge. This can provide batteries having higher capacity.

The compound represented by the composition formula (1) may satisfy $0.95 \leq (x+y)/(\alpha+\beta) \leq 1.0$.

This can provide batteries having higher capacity and better cycle characteristics.

When $(x+y)/(\alpha+\beta)$ is 1.0 or less, a cation-deficient structure is formed, and thus a larger number of Li diffusion paths are formed. This can provide batteries having higher capacity. Furthermore, cation deficits are randomly arranged in an initial state, and thus the structure is not destabilized when Li is deintercalated. This can provide batteries having good cycle characteristics and a long life.

In the lithium composite oxide according to the first embodiment, Li may be partly replaced with an alkali metal such as Na or K.

The positive electrode active material according to the first embodiment may contain the above-described lithium composite oxide as a main component (i.e., 50% or more relative to the entire positive electrode active material on a mass basis (50 mass % or more)).

This can provide batteries having better cycle characteristics.

The positive electrode active material according to the first embodiment may contain, on a mass basis, 70% or more (70 mass % or more) of the above-described lithium composite oxide relative to the entire positive electrode active material.

This can provide batteries having better cycle characteristics.

The positive electrode active material according to the first embodiment may contain, on a mass basis, 90% or more (90 mass % or more) of the above-described lithium composite oxide relative to the entire positive electrode active material.

This can provide batteries having better cycle characteristics.

The positive electrode active material according to the first embodiment may further contain unavoidable impurities in addition to the above-described lithium composite oxide.

The positive electrode active material according to the first embodiment may further contain, in addition to the above-described lithium composite oxide, at least one selected from the group consisting of a starting material used when the positive electrode active material is synthesized, a by-product, and a decomposition product.

The positive electrode active material according to the first embodiment may contain, for example, only the above-described lithium composite oxide except for unavoidable impurities.

This can provide batteries having better cycle characteristics.

Method for Producing Lithium Composite Oxide

Hereafter, an example of a method for producing a lithium composite oxide contained in the positive electrode active material according to the first embodiment will be described.

The lithium composite oxide according to the first embodiment can be produced by, for example, the following method.

A raw material containing Li, a raw material containing Me, and a raw material containing F are provided.

Examples of the raw material containing Li include oxides such as $Li_2O$ and $Li_2O_2$; salts such as LiF, $Li_2CO_3$, and LiOH; and lithium composite oxides such as $LiMeO_2$ and $LiMe_2O_4$.

Examples of the raw material containing Me include oxides such as $Me_2O_3$, salts such as $MeCO_3$ and $MeNO_3$, hydroxides such as $Me(OH)_2$ and MeOOH, and lithium composite oxides such as $LiMeO_2$ and $LiMe_2O_4$.

For example, when Me represents Mn, examples of the raw material containing Mn include manganese oxides such as $MnO_2$ and $Mn_2O_3$, salts such as $MnCO_3$ and $MnNO_3$, hydroxides such as $Mn(OH)_2$ and MnOOH, and lithium composite oxides such as $LiMnO_2$ and $LiMn_2O_4$.

Examples of the raw material containing F include LiF and transition metal fluorides.

These raw materials are weighed so as to have, for example, the molar ratio in the composition formula (1).

Thus, "x, y, $\alpha$, and $\beta$" in the composition formula (1) can be changed within the range in the composition formula (1).

The weighed raw materials are mixed with each other by, for example, a dry process or a wet process and mechanochemically reacted for 10 hours or more to obtain a compound (precursor). For example, a mixer such as a planetary ball mill can be used.

Then, the obtained compound is heat-treated. Thus, a lithium composite oxide according to the first embodiment is obtained.

The heat treatment conditions are appropriately set so that the lithium composite oxide according to the first embodiment is obtained. Although the optimum heat treatment conditions vary depending on other production conditions and the target composition, the present inventors have found that (A) Zs/Za tends to increase as the heat treatment temperature increases or as the heat treatment time increases and (B) the ratio $I_{(18°-20°)}/I_{(43°-46°)}$ tends to increase as the heat treatment temperature increases or as the heat treatment time increases. Therefore, manufacturers can determine the heat treatment conditions on the basis of these tendencies. The heat treatment temperature may be selected from, for example, the range of 200° C. to 900° C. and the heat treatment time may be selected from, for example, the range of 1 minute to 20 hours. The atmosphere during the heat treatment may be an air atmosphere, an oxygen atmosphere, or an inert atmosphere such as a nitrogen or argon atmosphere.

By controlling the raw materials used, the mixing conditions of the raw material mixture, and the heat treatment conditions as described above, the lithium composite oxide according to the first embodiment can be substantially obtained.

After the heat treatment, the obtained lithium composite oxide may be rapidly cooled at room temperature.

After the heat treatment, the obtained lithium composite oxide may be washed with water. This washing treatment can decrease Zs/Za.

The type of space group to which the crystal structure of the obtained lithium composite oxide belongs is determined in accordance with, for example, the chemical composition of a compound and the heat treatment conditions. The space group to which the crystal structure of the obtained lithium composite oxide belongs can be identified by, for example, X-ray diffraction measurement or electron diffraction measurement.

The average composition of the obtained lithium composite oxide can be determined by, for example, ICP emission spectrometry, an inert gas fusion-infrared absorption method, ion chromatography, or a combination thereof.

The energy required for mixing the elements can be further decreased by using, for example, a lithium-transition metal composite oxide as a precursor. This provides a lithium composite oxide with a higher purity according to the first embodiment.

As described above, the method for producing a positive electrode active material according to the first embodiment includes (a) a step of providing raw materials, (b) a step of mechanochemically reacting the raw materials to obtain a precursor of a positive electrode active material, and (c) a step of heat-treating the precursor to obtain a positive electrode active material.

The step (a) may include a step of preparing a raw material mixture by mixing the above-described raw materials such that the molar ratio of Li to Me is 1.3 or more and 1.9 or less.

Herein, the step (a) may include a step of producing a lithium compound serving as a raw material by a publicly known method.

The step (a) may include a step of preparing a raw material mixture by mixing the raw materials such that the molar ratio of Li to Me is 1.38 or more and 1.67 or less.

The step (b) may include a step of mechanochemically reacting the raw materials using a ball mill.

Second Embodiment

Hereafter, a second embodiment will be described. Note that the same description as in the first embodiment will be appropriately omitted to avoid redundancy.

A battery according to the second embodiment includes a positive electrode containing the positive electrode active material according to the first embodiment, a negative electrode, and an electrolyte.

This configuration can provide batteries having good cycle characteristics.

In the battery according to the second embodiment, the positive electrode may include a positive electrode active material layer. Herein, the positive electrode active material layer may contain the positive electrode active material according to the first embodiment as a main component (i.e., 50% or more relative to the entire positive electrode active material layer on a mass basis (50 mass % or more)).

This configuration can provide batteries having better cycle characteristics.

Alternatively, in the battery according to the second embodiment, the positive electrode active material layer may contain, on a mass basis, 70% or more (70 mass % or more) of the positive electrode active material according to the first embodiment relative to the entire positive electrode active material layer.

This configuration can provide batteries having better cycle characteristics.

Alternatively, in the battery according to the second embodiment, the positive electrode active material layer may contain, on a mass basis, 90% or more (90 mass % or more) of the positive electrode active material according to the first embodiment relative to the entire positive electrode active material layer.

This configuration can provide batteries having better cycle characteristics.

The battery according to the second embodiment can be used for, for example, lithium ion secondary batteries, nonaqueous electrolyte secondary batteries, and all-solid-state batteries.

That is, the negative electrode of the battery according to the second embodiment may contain, for example, a negative electrode active material capable of occluding and releasing lithium ions or a material capable of dissolving and precipitating lithium metal as a negative electrode active material on the surface.

In the battery according to the second embodiment, the electrolyte may be, for example, a nonaqueous electrolyte (e.g., nonaqueous electrolytic solution).

In the battery according to the second embodiment, the electrolyte may be, for example, a solid electrolyte.

FIG. 1 is a sectional view illustrating a schematic structure of a battery 10 that is an example of the battery according to the second embodiment.

As illustrated in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with, for example, a nonaqueous electrolyte (e.g., nonaqueous electrolytic solution).

The positive electrode 21, the negative electrode 22, and the separator 14 constitute an electrode assembly.

The electrode assembly is accommodated in the case 11.

The case 11 is sealed using the gasket 18 and the sealing plate 15.

The positive electrode 21 includes a positive electrode current collector 12 and a positive electrode active material layer 13 disposed on the positive electrode current collector 12.

The positive electrode current collector 12 is formed of, for example, a metal material (e.g., aluminum, stainless steel, or aluminum alloy).

The positive electrode current collector 12 may be omitted, and the case 11 may be used as a positive electrode current collector.

The positive electrode active material layer 13 contains the positive electrode active material according to the first embodiment.

The positive electrode active material layer 13 may optionally contain, for example, additives (e.g., a conductive agent, an ion conductive auxiliary agent, and a binding agent).

The negative electrode 22 includes a negative electrode current collector 16 and a negative electrode active material layer 17 disposed on the negative electrode current collector 16.

The negative electrode current collector 16 is formed of, for example, a metal material (e.g., aluminum, stainless steel, or aluminum alloy).

The negative electrode current collector 16 may be omitted, and the sealing plate 15 may be used as a negative electrode current collector.

The negative electrode active material layer 17 contains a negative electrode active material.

The negative electrode active material layer 17 may optionally contain, for example, additives (e.g., a conductive agent, an ion conductive auxiliary agent, and a binding agent).

Examples of the negative electrode active material include metal materials, carbon materials, oxides, nitrides, tin compounds, and silicon compounds.

The metal material may be a single metal or an alloy. Examples of the metal material include lithium metal and lithium alloys.

Examples of the carbon material include natural graphite, coke, partially graphitized carbon, carbon fiber, spherical carbon, artificial graphite, and amorphous carbon.

From the viewpoint of capacity density, the negative electrode active material may be silicon (Si), tin (Sn), a silicon compound, or a tin compound. The silicon compound and the tin compound may each be an alloy or a solid solution.

An example of the silicon compound is $SiO_x$ ($0.05<x<1.95$). A compound (alloy or solid solution) obtained by partly replacing a silicon atom of $SiO_x$ with another element may also be used. The other element is at least one element selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ ($0<x<2$), $SnO_2$, and $SnSiO_3$. One tin compound selected from the foregoing may be used alone. Alternatively, two or more tin compounds selected from the foregoing may be used in combination.

The negative electrode active material may have any form. A negative electrode active material having a publicly known form (e.g., particulate form or fibrous form) can be used.

Lithium may be supplied (occluded) to the negative electrode active material layer 17 by any method. Specifically, the method is a method (a) in which lithium is deposited onto the negative electrode active material layer 17 by a gas phase method such as a vacuum deposition method or a method (b) in which a lithium metal foil and the negative electrode active material layer 17 are heated while being in contact with each other. By any of the methods, lithium can be diffused into the negative electrode active material layer 17 using heat. Alternatively, lithium may be electrochemically occluded into the negative electrode active material layer 17. Specifically, a battery is assembled using a negative electrode 22 not containing lithium and a lithium metal foil (positive electrode). Then, the battery is charged so that lithium is occluded into the negative electrode 22.

Examples of the binding agent for the positive electrode 21 and the negative electrode 22 include polyvinylidene fluoride, polytetrafluoroethylene, polyethylene, polypropylene, aramid resin, polyimide, polyimide, polyimide-imide, polyacrylonitrile, polyacrylic acid, poly(methyl acrylate), poly(ethyl acrylate), poly(hexyl acrylate), polymethacrylic acid, poly(methyl methacrylate), poly(ethyl methacrylate), poly(hexyl methacrylate), polyvinyl acetate, polyvinylpyrrolidone, polyether, polyether sulfone, hexafluoropolypropylene, styrene-butadiene rubber, and carboxymethyl cellulose. Alternatively, the binding agent may be a copolymer of two or more materials selected from the group consisting of tetrafluoroethylene, hexafluoroethane, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid, and hexadiene. The binding agent may be a mixture of two or more materials selected from the foregoing materials.

Examples of the conductive agent for the positive electrode 21 and the negative electrode 22 include graphite, carbon black, conductive fibers, graphite fluoride, metal powder, conductive whiskers, conductive metal oxides, and organic conductive materials. Examples of the graphite include natural graphite and artificial graphite. Examples of the carbon black include acetylene black, Ketjenblack (registered trademark), channel black, furnace black, lamp black, and thermal black. An example of the metal powder is an aluminum powder. Examples of the conductive whiskers include zinc oxide whiskers and potassium titanate whiskers. An example of the conductive metal oxides is titanium oxide. An example of the organic conductive materials is a phenylene derivative.

The surface of the binding agent may be covered with a material used as the above conductive agent. For example, the surface of the binding agent may be covered with carbon black. This can increase the capacity of the battery.

The separator 14 may be formed of a material having high ion permeability and sufficient mechanical strength. Examples of the material include microporous thin films, woven fabric, and nonwoven fabric. Specifically, the separator 14 is desirably formed of a polyolefin such as polypropylene or polyethylene. The separator 14 formed of a polyolefin has not only high durability, but also a shutdown function exhibited when excessively heated. The separator 14 has a thickness of, for example, 10 to 300 μm (or 10 to 40 μm). The separator 14 may be a single-layer membrane formed of one material. Alternatively, the separator 14 may be a composite membrane (multilayer membrane) formed of two or more materials. The separator 14 has a porosity of, for example, 30% to 70% (or 35% to 60%). The term "porosity" refers to a proportion of the volume of pores to the total volume of the separator 14. The "porosity" is measured by, for example, mercury intrusion.

The nonaqueous electrolytic solution contains a nonaqueous solvent and a lithium salt dissolved in the nonaqueous solvent.

Examples of the nonaqueous solvent include cyclic carbonate solvents, linear carbonate solvents, cyclic ether solvents, linear ether solvents, cyclic ester solvents, linear ester solvents, and fluorinated solvents.

Examples of the cyclic carbonate solvents include ethylene carbonate, propylene carbonate, and butylene carbonate.

Examples of the linear carbonate solvents include dimethyl carbonate, ethyl methyl carbonate, and diethyl carbonate.

Examples of the cyclic ether solvents include tetrahydrofuran, 1,4-dioxane, and 1,3-dioxolane.

Examples of the linear ether solvents include 1,2-dimethoxyethane and 1,2-diethoxyethane.

An example of the cyclic ester solvents is γ-butyrolactone.

An example of the linear ester solvents is methyl acetate.

Examples of the fluorinated solvents include fluoroethylene carbonate, methyl fluoropropionate, fluorobenzene, fluoroethyl methyl carbonate, and fluorodimethylene carbonate.

One nonaqueous solvent selected from the foregoing solvents may be used alone. Alternatively, two or more nonaqueous solvents selected from the foregoing solvents may be used in combination.

The nonaqueous electrolytic solution may contain at least one fluorinated solvent selected from the group consisting of fluoroethylene carbonate, methyl fluoropropionate, fluorobenzene, fluoroethyl methyl carbonate, and fluorodimethylene carbonate.

When these fluorinated solvents are contained in the nonaqueous electrolytic solution, the oxidation resistance of the nonaqueous electrolytic solution is improved.

As a result, even when the battery 10 is charged at high voltage, the battery 10 can be stably operated.

In the battery according to the second embodiment, the electrolyte may be a solid electrolyte.

Examples of the solid electrolyte include organic polymer solid electrolytes, oxide solid electrolytes, and sulfide solid electrolytes.

An example of the organic polymer solid electrolytes is a compound of a polymer compound and a lithium salt.

The polymer compound may have an ethylene oxide structure. In this case, a large amount of the lithium salt can be contained, which can further improve the ionic conductivity.

Examples of the oxide solid electrolytes include NASICON solid electrolytes such as $LiTi_2(PO_4)_3$ and its element-substituted derivatives; $(LaLi)TiO_3$-based perovskite solid electrolytes; LISICON solid electrolytes such as $Li_{14}ZnGe_4O_{16}$, $Li_4SiO_4$, $LiGeO_4$, and their element-substituted derivatives; garnet solid electrolytes such as $Li_7La_3Zr_2O_{12}$ and its element-substituted derivatives; $Li_3N$ and its H-substituted derivatives; and $Li_3PO_4$ and its N-substituted derivatives.

Examples of the sulfide solid electrolytes include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Furthermore, LiX (X: F, Cl, Br, or I), $MO_y$, $Li_xMO_y$ (M: P, Si, Ge, B, Al, Ga, or In) (x and y: natural number), or the like may be added to the foregoing sulfide solid electrolytes.

In particular, among these solid electrolytes, sulfide solid electrolytes have excellent formability and high ionic conductivity. Therefore, the use of the sulfide solid electrolytes can provide batteries having a higher energy density.

Among the sulfide solid electrolytes, $Li_2S$—$P_2S_5$ has high electrochemical stability and higher ionic conductivity. Therefore, the use of $Li_2S$—$P_2S_5$ as a solid electrolyte can provide batteries having a higher energy density.

A solid electrolyte layer may contain the above-described nonaqueous electrolytic solution.

When a solid electrolyte layer contains the nonaqueous electrolytic solution, lithium ion transfer is facilitated between the active material and the solid electrolyte. This can provide batteries having a higher energy density.

The solid electrolyte layer may contain, for example, a gel electrolyte and an ionic liquid in addition to the solid electrolyte.

The gel electrolyte may be a polymer material containing a nonaqueous electrolytic solution. Examples of the polymer material include polyethylene oxide, polyacrylonitrile, polyvinylidene fluoride, poly(methyl methacrylate), and polymers having an ethylene oxide bond.

Examples of cations for the ionic liquid include chain aliphatic quaternary salts such as tetraalkylammoniums and tetraalkylphosphoniums; alicyclic ammoniums such as pyrrolidiniums, morpholiniums, imidazoliniums, tetrahydropyrimidiniums, piperaziniums, and piperidiniums; and nitrogen-containing heterocyclic aromatic cations such as pyridiniums and imidazoliums. Examples of anions for the ionic liquid include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain a lithium salt.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from the foregoing lithium salts may be used alone. Alternatively, two or more lithium salts selected from the foregoing lithium salts may be used as a mixture. The concentration of the lithium salt is, for example, in the range of 0.5 to 2 mol/L.

The battery according to the second embodiment may have various forms. For example, coin batteries, cylinder batteries, prismatic batteries, sheet batteries, button batteries, flat batteries, and stack batteries may be employed.

EXAMPLES

Example 1

Production of Positive Electrode Active Material

LiF, $Li_2MnO_3$, $LiMnO_2$, $LiCoO_2$, and $LiNiO_2$ were weighed so as to have a molar ratio of Li/Mn/Co/Ni/O/F=1.2/0.54/0.13/0.13/1.9/0.1.

The weighed raw materials were inserted into a 45 cc zirconia container together with an appropriate amount of φ3 mm zirconia balls, and the container was hermetically sealed in an argon glove box.

The raw materials were then taken out of the argon glove box and treated with a planetary ball mill at 600 rpm for 30 hours to obtain a precursor.

The obtained precursor was subjected to powder X-ray diffraction measurement.

The space group of the obtained precursor was Fm-3m.

The obtained precursor was then heat-treated in an air atmosphere at 700° C. for 1 hour and then rapidly cooled at room temperature.

The obtained positive electrode active material was subjected to powder X-ray diffraction measurement.

Figure 2:
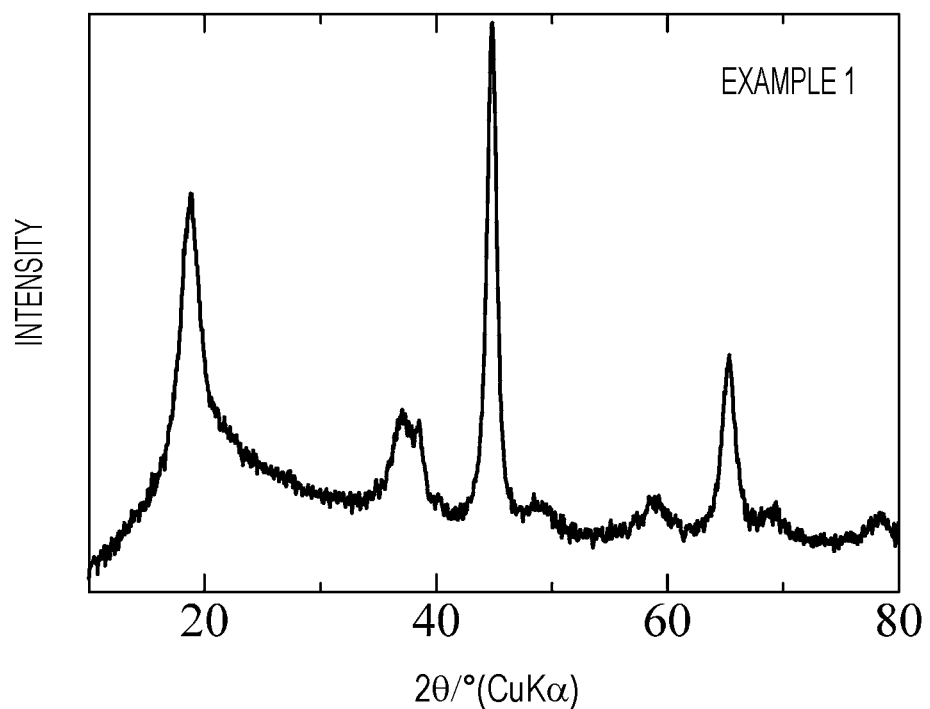
FIG. 2 illustrates an XRD pattern of a positive electrode active material in Example 1.

FIG. 2 illustrates the measurement result.

The space group of the obtained positive electrode active material was C2/m.

The ratio $I_{(18°-20°)}/I_{(43°-46°)}$ of the obtained positive electrode active material was 0.66.

The average composition of the obtained positive electrode active material was then measured.

The average composition of the obtained positive electrode active material was $Li_{1.2}Mn_{0.64}Co_{0.13}Ni_{0.13}O_{1.9}F_{0.1}$.

The obtained positive electrode active material was then subjected to XPS measurement.

Figure 3:
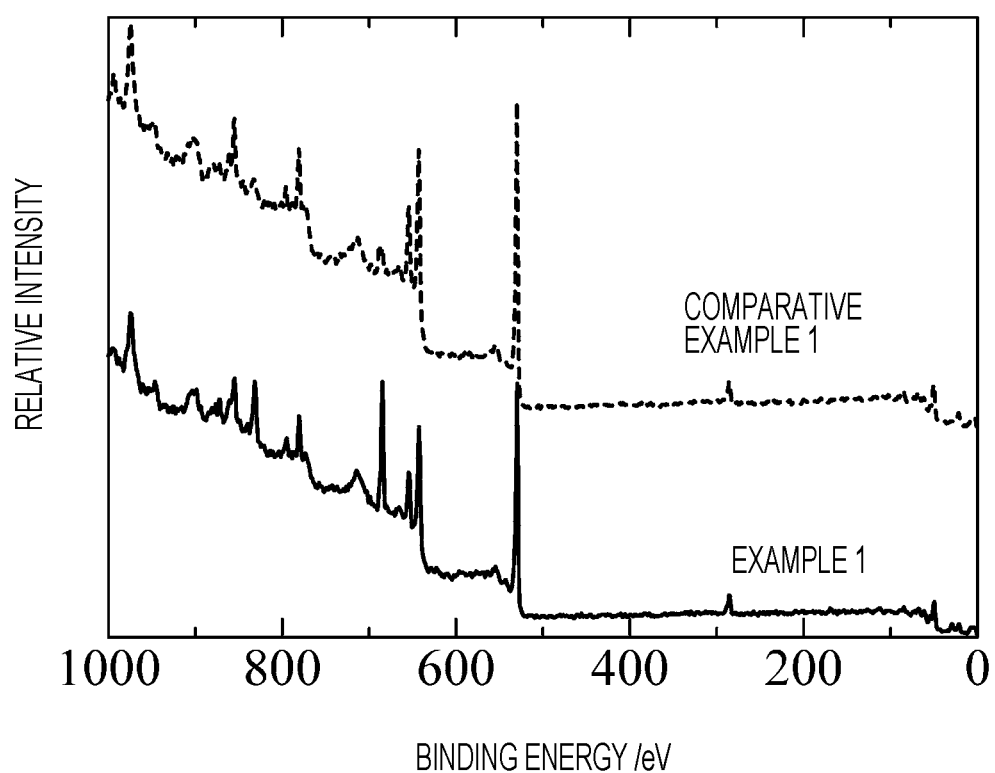
FIG. 3 illustrates the results of XPS measurement performed on positive electrode active materials in Example 1 and Comparative Example 1.

FIG. 3 illustrates the measurement result.

The ratio Zs/Za of the obtained positive electrode active material was 5.6.

Production of Battery

Subsequently, 70 parts by mass of the above positive electrode active material, 20 parts by mass of a conductive agent, 10 parts by mass of polyvinylidene fluoride (PVDF), and an appropriate amount of 2-methylpyrrolidone (NMP) were mixed with each other. Thus, a positive electrode mixture slurry was prepared.

The positive electrode mixture slurry was applied onto one surface of a positive electrode current collector having a thickness of 20 μm and formed of an aluminum foil.

The positive electrode mixture slurry was dried and rolled to obtain a positive electrode plate including a positive electrode active material layer and having a thickness of 60 μm.

The obtained positive electrode plate was stamped into a circular shape with a diameter of 12.5 mm to obtain a positive electrode.

Furthermore, a lithium metal foil having a thickness of 300 μm was stamped into a circular shape with a diameter of 14.0 mm to obtain a negative electrode.

Fluoroethylene carbonate (FEC), ethylene carbonate (EC), and ethyl methyl carbonate (EMC) were mixed at a volume ratio of 1:1:6 to obtain a nonaqueous solvent.

$LiPF_6$ was dissolved in the nonaqueous solvent in a concentration of 1.0 mol/L to obtain a nonaqueous electrolytic solution.

A separator (manufactured by Celgard, LLC., product number: 2320, thickness: 25 μm) was impregnated with the obtained nonaqueous electrolytic solution. The separator is a three-layer separator including a polypropylene layer, a polyethylene layer, and a polypropylene layer.

The positive electrode, the negative electrode, and the separator were assembled in a dry box in which the dew point was controlled to −50° C., and thus a CR2032 coin battery was produced.

Examples 2 to 7

The raw materials and the mixing ratio of Li/Me/O/F were changed from those in Example 1.

The heat treatment conditions were also changed from those in Example 1.

Except for this, positive electrode active materials in Examples 2 to 7 were synthesized in the same manner as in Example 1.

Table 1 shows the data of the positive electrode active materials in Examples 2 to 7.

Furthermore, coin batteries in Examples 2 to 7 were produced in the same manner as in Example 1 using the positive electrode active materials in Examples 2 to 7.

Comparative Example 1

A positive electrode active material having an average composition of $Li_{1.2}Mn_{0.54}Co_{0.13}Ni_{0.13}O_{1.9}F_{0.1}$ was obtained in the same manner as in Example 1.

Herein, the obtained precursor was rapidly cooled at room temperature and then washed with water.

The obtained positive electrode active material was subjected to powder X-ray diffraction measurement.

The space group of the obtained positive electrode active material was C2/m.

The ratio $I_{(18°-20°)}/I_{(43°-46°)}$ of the obtained positive electrode active material was 0.56.

The obtained positive electrode active material was then subjected to XPS measurement.

FIG. 3 illustrates the measurement result.

The ratio Zs/Za of the obtained positive electrode active material was 0.8.

A coin battery in Comparative Example 1 was produced in the same manner as in Example 1 using the obtained positive electrode active material.

Comparative Example 2

A positive electrode active material having an average composition of $Li_{1.2}Mn_{0.54}Co_{0.13}Ni_{0.13}O_{1.9}F_{0.1}$ was obtained in the same manner as in Example 1.

Herein, the heat treatment conditions were changed from those in Example 1.

The obtained positive electrode active material was subjected to powder X-ray diffraction measurement.

The space group of the obtained positive electrode active material was C2/m.

The ratio $I_{(18°-20°)}/I_{(43°-46°)}$ of the obtained positive electrode active material was 1.05.

The obtained positive electrode active material was then subjected to XPS measurement.

The ratio Zs/Za of the obtained positive electrode active material was 8.6.

A coin battery in Comparative Example 2 was produced in the same manner as in Example 1 using the obtained positive electrode active material.

Comparative Examples 3 and 4

The raw materials and the mixing ratio of Li/Me/O/F were changed from those in Example 1.

The heat treatment conditions were changed from those in Example 1.

Furthermore, the obtained precursor was rapidly cooled at room temperature and then washed with water.

Except for this, positive electrode active materials in Comparative Examples 3 and 4 were synthesized in the same manner as in Example 1.

Table 1 shows the data of the positive electrode active materials in Comparative Examples 3 and 4.

Furthermore, coin batteries in Comparative Examples 3 and 4 were produced in the same manner as in Example 1 using the positive electrode active materials in Comparative Examples 3 and 4.

Comparative Example 5

The raw materials and the mixing ratio of Li/Me/O/F were changed from those in Example 1.

After the treatment with a ball mill, heat treatment was not performed.

Except for this, a positive electrode active material in Comparative Example 5 was synthesized in the same manner as in Example 1.

The obtained positive electrode active material was subjected to powder X-ray diffraction measurement.

The space group of the obtained positive electrode active material was Fm-3m.

Since the space group Fm-3m indicates a distorted rock-salt structure, no peak is present at a diffraction angle 2θ of 18° or more and 20° or less. Therefore, the ratio $I_{(18°-20°)}/I_{(43°-46°)}$ was not calculated.

The obtained positive electrode active material was then subjected to XPS measurement.

The ratio Zs/Za of the obtained positive electrode active material was 2.4.

A coin battery in Comparative Example 5 was produced in the same manner as in Example 1 using the obtained positive electrode active material.

Evaluation of Battery

The current density at the positive electrode was set to 0.5 mA/cm$^2$ and the batteries in Examples 1 to 7 and Comparative Examples 1 to 5 were charged until the voltage reached 4.9 V.

Subsequently, the end-of-discharge voltage was set to 2.5 V and the batteries in Examples 1 to 7 and Comparative Examples 1 to 5 were discharged at a current density of 0.5 mA/cm$^2$.

Furthermore, 20 cycles of the charge-discharge test were repeatedly performed to measure the capacity retention of the batteries in Examples 1 to 7 and Comparative Examples 1 to 5.

The initial discharge capacity of the battery in Example 1 was 299 mAh/g. On the other hand, the initial discharge capacity of the battery in Comparative Example 1 was 294 mAh/g.

The capacity retention after 20 cycles of the battery in Example 1 was 87%. On the other hand, the capacity retention after 20 cycles of the battery in Comparative Example 1 was 85%.

Table 1 shows the results.

not particularly limited as long as $1<Zs/Za$ and $0.05 \leq I_{(18°-20°)}/I_{(43°-46°)} \leq 0.90$ are satisfied.

As shown in Table 1, the battery in Example 5 has a higher capacity retention after 20 cycles than the batteries in Examples 1 to 4.

The reason for this is believed to be as follows. In the battery in Example 5, the lithium composite oxide contained in the positive electrode active material contains Al. That is, the crystal structure of the lithium composite oxide is stabilized by adding Al that readily forms covalent bonds and has a strong tendency to be electrochemically inactive. Thus, the cycle characteristics are improved.

As shown in Table 1, the battery in Comparative Example 2 has a lower initial discharge capacity than the batteries in Examples 1 to 5 and Comparative Example 1.

The reason for this is believed to be as follows. In the battery in Comparative Example 2, the lithium composite oxide contained in the positive electrode active material does not satisfy $0.05 \leq I_{(18°-20°)}/I_{(43°-46°)} \leq 0.90$. That is, for example, the "cation mixing" in the lithium composite oxide is reduced and thus the Li occupancy in the "transition metal

TABLE 1

| | Average composition | Za | Zs | Zs/Za | Space group | $I_{(18°-20°)}/I_{(43°-46°)}$ | Discharge capacity (mAh/g) | Capacity retention (%) |
|---|---|---|---|---|---|---|---|---|
| Example 1 | $Li_{1.2}Mn_{0.54}Co_{0.13}Ni_{0.13}O_{1.9}F_{0.1}$ | 0.05 | 0.28 | 5.6 | C2/m | 0.66 | 299 | 87 |
| Example 2 | $Li_{1.2}Mn_{0.54}Co_{0.13}Ni_{0.13}O_{1.9}F_{0.1}$ | 0.05 | 0.39 | 7.8 | C2/m | 0.90 | 296 | 86 |
| Example 3 | $Li_{1.2}Mn_{0.54}Co_{0.13}Ni_{0.13}O_{1.9}F_{0.1}$ | 0.05 | 0.22 | 4.4 | C2/m | 0.51 | 294 | 86 |
| Example 4 | $Li_{1.2}Mn_{0.54}Co_{0.13}Ni_{0.13}O_{1.9}F_{0.1}$ | 0.05 | 0.14 | 2.8 | C2/m | 0.39 | 292 | 86 |
| Example 5 | $Li_{1.2}Mn_{0.49}Co_{0.13}Ni_{0.13}Al_{0.05}O_{1.9}F_{0.1}$ | 0.05 | 0.20 | 4.0 | C2/m | 0.50 | 289 | 88 |
| Example 6 | $Li_{1.2}Mn_{0.4}Co_{0.4}O_{1.9}F_{0.1}$ | 0.05 | 0.24 | 4.8 | R-3m | 0.77 | 260 | 86 |
| Example 7 | $Li_{1.2}Mn_{0.8}O_{1.33}F_{0.67}$ | 0.335 | 0.47 | 1.4 | Fd-3m | 0.05 | 272 | 80 |
| Comparative Example 1 | $Li_{1.2}Mn_{0.54}Co_{0.13}Ni_{0.13}O_{1.9}F_{0.1}$ | 0.05 | 0.04 | 0.8 | C2/m | 0.56 | 294 | 85 |
| Comparative Example 2 | $Li_{1.2}Mn_{0.54}Co_{0.13}Ni_{0.13}O_{1.9}F_{0.1}$ | 0.05 | 0.43 | 8.6 | C2/m | 1.05 | 286 | 84 |
| Comparative Example 3 | $Li_{1.2}Mn_{0.4}Co_{0.4}O_{1.9}F_{0.1}$ | 0.05 | 0.04 | 0.8 | R-3m | 0.77 | 255 | 84 |
| Comparative Example 4 | $Li_{1.2}Mn_{0.8}O_{1.33}F_{0.67}$ | 0.335 | 0.335 | 1.0 | Fd-3m | 0.05 | 271 | 77 |
| Comparative Example 5 | $Li_{1.2}Mn_{0.8}O_{1.67}F_{0.33}$ | 0.165 | 0.40 | 2.4 | Fm-3m | — | 257 | 76 |

As shown in Table 1, the batteries in Examples 1 to 5 have a higher capacity retention after 20 cycles than the batteries in Comparative Examples 1 and 2.

As shown in Table 1, the battery in Example 6 has a higher capacity retention after 20 cycles than the battery in Comparative Example 3.

As shown in Table 1, the battery in Example 7 has a higher capacity retention after 20 cycles than the battery in Comparative Example 4.

The reason for this is believed to be as follows. In the batteries in Examples 1 to 7, the lithium composite oxide contained in the positive electrode active material satisfies $1<Zs/Za$ and $0.05 \leq I_{(18°-20°)}/I_{(43°-46°)} \leq 0.90$. That is, the oxidation-reduction reaction of oxygen near the surface of the lithium composite oxide can be suppressed while high Li diffusibility and high stability of the crystal structure are maintained. Thus, the cycle characteristics are improved.

The above results also show that the lithium composite oxide contained in the positive electrode active material has only to include, for example, a phase having a crystal structure that belongs to a space group C2/m, R-3m, or Fd-3m. That is, the space group to which the crystal structure of the lithium composite oxide belongs is believed to be layer" is decreased, which decreases the number of three-dimensional Li diffusion paths. Thus, the initial discharge capacity is decreased.

As shown in Table 1, the battery in Comparative Example 5 has a lower capacity retention after 20 cycles than the batteries in Examples 1 to 7 and Comparative Examples 1 to 4.

The reason for this is believed to be as follows. In the battery in Comparative Example 5, the lithium composite oxide contained in the positive electrode active material includes a single phase having a crystal structure that belongs to a space group Fm-3m and does not satisfy $0.05 \leq I_{(18°-20°)}/I_{(43°-46°)} \leq 0.90$. That is, even when the lithium composite oxide satisfies $1<Zs/Za$, the cycle characteristics are relatively deteriorated unless $0.05 \leq I_{(18°-20°)}/I_{(43°-46°)} \leq 0.90$ is satisfied.

What is claimed is:
1. A positive electrode active material comprising:
   a lithium composite oxide containing fluorine and oxygen,
   wherein the lithium composite oxide satisfies $1<Zs/Za<8$,
   where Zs represents a first ratio of a molar quantity of the fluorine to a total molar quantity of the fluorine and the oxygen in X-ray photoelectron spectroscopy of the lithium composite oxide, and Za represents a second ratio of a molar quantity of the fluorine to a total molar quantity of the fluorine and the oxygen in an average composition of the lithium composite oxide, an X-ray diffraction pattern of the lithium composite oxide includes a first maximum peak within a first range of 18° to 20° at a diffraction angle 2θ and a second maximum peak within a second range of 43° to 46° at the diffraction angle 2θ, and a ratio $I_{(18°-20°)}/I_{(43°-46°)}$ of a first integrated intensity $I_{(18°-20°)}$ of the first maximum peak to a second integrated intensity $I_{(43°-46°)}$ of the second maximum peak satisfies $0.05 \leq I_{(18°-20°)}/I_{(43°-46°)} \leq 0.90$.

2. The positive electrode active material according to claim 1, wherein $1.4 \leq Zs/Za \leq 7.8$.

3. The positive electrode active material according to claim 1, wherein
the lithium composite oxide includes a phase, of which a crystal structure belongs to a space group C2/m, R-3m, or Fd-3m.

4. The positive electrode active material according to claim 3, wherein
the crystal structure of the phase belongs to a space group C2/m.

5. The positive electrode active material according to claim 3, wherein
the lithium composite oxide further includes another phase, of which a crystal structure belongs to a space group Fm-3m.

6. The positive electrode active material according to claim 1, wherein
the lithium composite oxide contains at least one selected from manganese, cobalt, nickel, and aluminum.

7. The positive electrode active material according to claim 6, wherein
the lithium composite oxide contains manganese.

8. The positive electrode active material according to claim 1, wherein
the average composition of the lithium composite oxide is represented by a formula $Li_xMe_yO_\alpha F_\beta$, where Me is at least one selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al; $1.05 \leq x \leq 1.4$; $0.6 \leq y \leq 0.95$; $1.2 \leq \alpha < 2$; and $0 < \beta \leq 0.8$.

9. The positive electrode active material according to claim 8, wherein
Mn constitutes 50 mol % or more of Me.

10. The positive electrode active material according to claim 8, wherein $1.15 \leq x \leq 1.25$, and $0.75 \leq y \leq 0.85$.

11. The positive electrode active material according to claim 8, wherein $1.33 \leq \alpha \leq 1.9$, and $0.1 \leq \beta \leq 0.67$.

12. The positive electrode active material according to claim 1, wherein a mass ratio of the lithium composite oxide to the positive-electrode active material is 50% or more.

13. A battery comprising:
a positive electrode containing the positive electrode active material according to claim 1;
a negative electrode; and
an electrolyte.

14. The battery according to claim 13,
wherein the negative electrode includes a negative electrode active material which lithium ions are occluded in and released from, or a material which lithium metal is dissolved from and deposited on, and
the electrolyte is a nonaqueous electrolytic solution.

15. The battery according to claim 13,
wherein the negative electrode includes a negative electrode active material which lithium ions are occluded in and released from, or a material which lithium metal is dissolved from and deposited on, and
the electrolyte is a solid electrolyte.

* * * * *